United States Patent
Verhoog

(10) Patent No.: US 6,296,968 B1
(45) Date of Patent: Oct. 2, 2001

(54) ONE-PIECE BATTERY INCORPORATING A CIRCULATING FLUID TYPE HEAT EXCHANGER

(75) Inventor: Roelof Verhoog, Bordeaux (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/327,534

(22) Filed: Jun. 8, 1999

(30) Foreign Application Priority Data

Jun. 11, 1998 (FR) .................................................. 98 07341

(51) Int. Cl.$^7$ ............................ H01M 10/50; H01M 6/00
(52) U.S. Cl. ............................ 429/120; 429/61; 429/62; 429/71; 429/72; 429/81; 429/82; 429/88; 429/149; 429/154; 429/163; 29/623.1; 29/623.2
(58) Field of Search ................................ 429/61, 62, 71, 429/72, 81, 82, 88, 149, 154, 163, 120; 29/623.1, 623.2

(56) References Cited

U.S. PATENT DOCUMENTS

| | | | |
|---|---|---|---|
| 5,443,926 | 8/1995 | Holland et al. ....................... | 429/120 |
| 5,460,900 | 10/1995 | Rao et al. ............................. | 429/72 |
| 5,641,589 | 6/1997 | Grivel et al. ......................... | 429/120 |
| 5,985,483 | 11/1999 | Verhoog et al. ..................... | 429/120 |

FOREIGN PATENT DOCUMENTS

| | | |
|---|---|---|
| 0 596 778 A1 | 5/1994 | (EP) . |
| 0 613 204 A1 | 8/1994 | (EP) . |
| 0 624 916 A1 | 11/1994 | (EP) . |
| 2 472 002 | 6/1981 | (FR) . |
| 2 633 102 A1 | 12/1989 | (FR) . |
| 0 596 794 A1 | 5/1994 | (FR) . |
| 2 003 653 | 3/1979 | (GB) . |
| 61 045571 | 3/1986 | (JP) . |
| 08 227700 | 9/1996 | (JP) . |

Primary Examiner—Stephen Kalafut
Assistant Examiner—Angela J. Martin
(74) Attorney, Agent, or Firm—Sughrue, Mion, Zinn, Macpeak & Seas, PLLC

(57) ABSTRACT

A one-piece battery comprises a tank divided into cells each receiving an electrode assembly, closure means for the tank and a circulating fluid type heat exchanger facing the relatively larger faces of the electrode assembly. The fluid flows in a compartment defined by two flanges which incorporate a fluid inlet orifice communicating with a common inlet manifold and a fluid outlet orifice communicating with a common outlet manifold. The tank comprises at least two units and each unit comprises at least one cell delimited by walls. The wall facing a relatively larger face of the electrode assembly constitutes one of the flanges. Each unit further incorporates a portion of an inlet and outlet manifold. The units are fastened together so that the flanges when placed face-to-face form a sealed circulation compartment and the portions of the same manifold are aligned with each other.

7 Claims, 4 Drawing Sheets

ONE-PIECE BATTERY INCORPORATING A CIRCULATING FLUID TYPE HEAT EXCHANGER

BACKGROUND OF THE INVENTION

1. Field of the Invention

The present invention concerns a one-piece battery incorporating a circulating fluid type heat exchanger.

2. Description of the Prior Art

The electrode assemblies of a one-piece battery are contained in cells of a single container. The container is usually prism-shaped. Each electrode assembly comprises alternating positive and negative electrodes separated from each other by a separator and impregnated with an electrolyte. The electrode assembly has two relatively smaller faces corresponding to the edges of the stacked electrodes and two relatively larger faces parallel to the surfaces of the electrodes.

Such batteries are used in particular to power electric vehicles. A one-piece nickel-cadmium or nickel-metal hydride battery has a capacity in the range from 5 Ah to 250 Ah.

The various states of use of a storage battery (charging, overcharging, discharging) are known to raise its temperature, which modifies its performance. The most effective way to cool the battery is to remove the heat using a circulating fluid, in particular a heat exchange fluid. Many heat exchangers have been proposed that are independent of the battery and placed in contact with it. Most such systems increase the weight and overall size of the battery to an unacceptable degree.

A one-piece battery including a compact cooling system has recently been proposed. The battery has a single prism-shaped plastics material container consisting of a tank and a lid carrying the terminals. The tank includes cells in which the electrode assemblies are placed separated by partitions. The cooling system includes two flanges welded and sealed to respective opposite walls of the plastics material tank. Each flange defines with the corresponding wall a circulation compartment for the liquid having at the top an inlet orifice and an outlet orifice leading into the lid of the battery.

For the electrode assemblies to be uniformly cooled, a system of the above kind is preferably placed on the walls of the tank facing the edges of the electrodes. In the case of high-power batteries, cooling the edges of the electrodes is insufficient to maintain the battery at a suitable temperature. To increase the heat exchange area it is therefore necessary for the heat to be transferred via the wall facing the relatively larger faces of each assembly.

U.S. Pat. No. 5,356,735 describes a one-piece battery including a heat exchanger of the above kind and whose container comprises a single prism-shaped tank and a lid in several parts. The liquid circulation compartments are formed by two facing flanges. The compartments constitute partitions separating the cells. To this end the perimeter of the partitions is engaged in grooves formed on the walls of the tank. Each compartment is individually connected to an inlet/outlet manifold. To prevent the liquid entering the cells, a coupling unit nested in a housing provides communication between each compartment and the manifold. This complex assembly system has many joints, which makes it somewhat unreliable, in particular with regard to the risk of the heat exchange liquid leaking into the cells.

The liquid inlet and outlet of each compartment are connected to a common inlet and outlet by longitudinal manifolds formed in an attached lid. The two longitudinal manifolds clutter the lid. To compensate for this, the lid carries only two terminals for connecting the battery to an external circuit. This requires the use of an internal electrical connection arrangement that has to pass in a sealed manner through the partition separating two contiguous cells and comprising the liquid circulation compartment. Lead-through devices are not sufficiently reliable electrically or mechanically to be used in an electric vehicle.

Manifolds of increasing diameter are formed by joining two complementary parts of the lid, each carrying passages. The lid, formed of three superposed parts, fits onto the tank. For a battery comprising a given number of electrode assemblies, the dimensions of the various parts constituting the container are fixed. Accordingly, each battery of given capacity has its own specific components, which makes industrial manufacture less flexible and more costly.

The aim of the present invention is to propose a one-piece battery provided with a compact and effective heat exchanger and which is simpler to manufacture and more reliable than prior art systems.

Another aim of the present invention is to propose a one-piece battery provided with a heat exchanger and in which the number of electrode assemblies can easily be modified.

SUMMARY OF THE INVENTION

The present invention consists in a one-piece battery comprising a tank divided into cells each receiving an electrode assembly, closure means for the tank and a circulating fluid type heat exchanger facing relatively larger faces of the assembly, wherein the fluid flows in a compartment defined by two flanges, the compartment has a fluid inlet orifice communicating with a common inlet manifold and a fluid outlet orifice communicating with a common outlet manifold, the tank comprises at least two units, each unit comprises at least one of the cells delimited by at least one wall facing a relatively larger face of the assembly that constitutes one of the flanges, each unit further comprises a portion of the inlet manifold and the outlet manifold, and the units are fastened together so that the flanges when placed face-to-face form a sealed circulation compartment and the portions of the same manifold are aligned with each other.

The one-piece battery of the invention comprises a tank that is generally, although not exclusively, made of plastics material. The tank is divided into cells by walls, each cell receiving an electrode assembly.

In accordance with the present invention, the tank is formed by assembling a plurality of units side by side and fixing them together, for example welding them or gluing them together. Each unit provides at least one cell delimited by walls, but can comprise two or more cells. Each unit is manufactured in one piece, for example molded in one piece. The units are therefore of unitary construction, which limits the number of joints.

The battery also includes a circulating fluid type heat exchanger facing the relatively larger faces of the assembly. The fluid flows in a flat compartment defined by two flanges and which forms at least one of the walls between cells. The compartment has at the top a fluid inlet orifice communicating with a common inlet manifold and a fluid outlet orifice communicating with a common outlet manifold.

In accordance with the invention, at least one of the walls of each unit facing the relatively larger sides of the electrode assembly constitutes one of the flanges. In the case of prism-shaped units, the two opposite faces that face the relatively larger faces of the electrode assembly preferably each constitute one flange. If the unit includes more than one cell, they are preferably attached together by the face opposite the edges of the electrodes.

The units are interconnected so that the flange of one unit faces the flange of the contiguous unit to form a fluid circulation compartment. The units constituting the ends of the tank have a contiguous unit on only one side. Only one of the walls facing the relatively larger faces of the electrode assembly constitutes one of the flanges, which is welded to the flange of the contiguous unit.

The unit at the end of the battery is advantageously connected on one side to the contiguous unit and on the side opposite the other elements to a plate constituting a flange for closing the circulation compartment. The compartment closed by the flange constitutes the outside lateral wall of the battery. The electrode assembly contained in the end unit of the battery is therefore cooled via two opposite faces, in an analogous manner to the units at the center of the battery.

In a preferred embodiment of the invention the closure means are in the lower part of the tank and constitute a bottom fixed and sealed to the tank.

The inlet manifold and the outlet manifold are preferably on the face of the tank opposite the bottom. Also, each unit has, on the face opposite the bottom, orifices to accommodate (for example) two terminals, a relief valve, an electrolyte filler orifice, etc. for each cell. The portions of the manifolds and likewise the orifices are formed at the same time as the unit, for example molded at the same time as the unit. Each cell has a terminal for each polarity. The electrode assemblies are electrically connected outside the cells, eliminating the need for any internal electrical connection system.

At least one of the flanges preferably carries a plurality of ribs forming chicanes for causing the fluid flowing in the compartment to flow alternately in one direction and in the opposite direction. In one embodiment of the invention one of the two flanges has the fluid inlet and outlet orifices in its upper part, but each of the flanges forming the circulation compartment could carry half these orifices.

Each unit further includes a portion of the inlet manifold and the outlet manifold. The fluid inlet and outlet orifices of each compartment respectively communicate with the corresponding manifold portion integral with the unit. When the units have been placed one against the other, each manifold portion fits perfectly to the corresponding contiguous portion to form a common inlet or outlet manifold whose length depends on that of the battery, that is to say on the number of units joined side-by-side.

The advantage of the present invention is that it proposes a one-piece battery of modular design whose capacity can easily be modified by varying the number of cells, which are identical with the possible exception of the end cells, which incorporate minor modifications. Only the bottom differs in size, but it is also feasible for the bottom to be made from units previously welded together.

The present invention also consists in a method of manufacturing a battery in accordance with the present invention. The method comprises the following steps:

at least two of the units are molded in one piece,
the units are placed side by side so that the flanges are pressed together and the manifold portions match up,
the periphery of the compartment formed by the flanges and the walls of the manifold portions are welded and sealed to obtain the tank, an electrode assembly is introduced into each cell, and
the bottom is welded to the tank.

In accordance with an improvement of the invention, after welding and sealing the periphery of the compartment formed by the flanges and the walls of the manifold portions, a plate constituting a flange is welded to each end to obtain the tank.

The present invention has the advantage of proposing a method of manufacturing a one-piece battery in which the units forming the tank are first heat-welded together, which seals the fluid circuit. The fluid circuit has no welds shared with the cells, which eliminates any risk of the fluid leaking into the cells.

The invention will be more clearly understood and its other advantages and features will become apparent on reading the following description, given by way of non-limiting example and with reference to the accompanying drawings.

DETAILED DESCRIPTION OF THE PREFERRED EMBODIMENT

Figure 1:
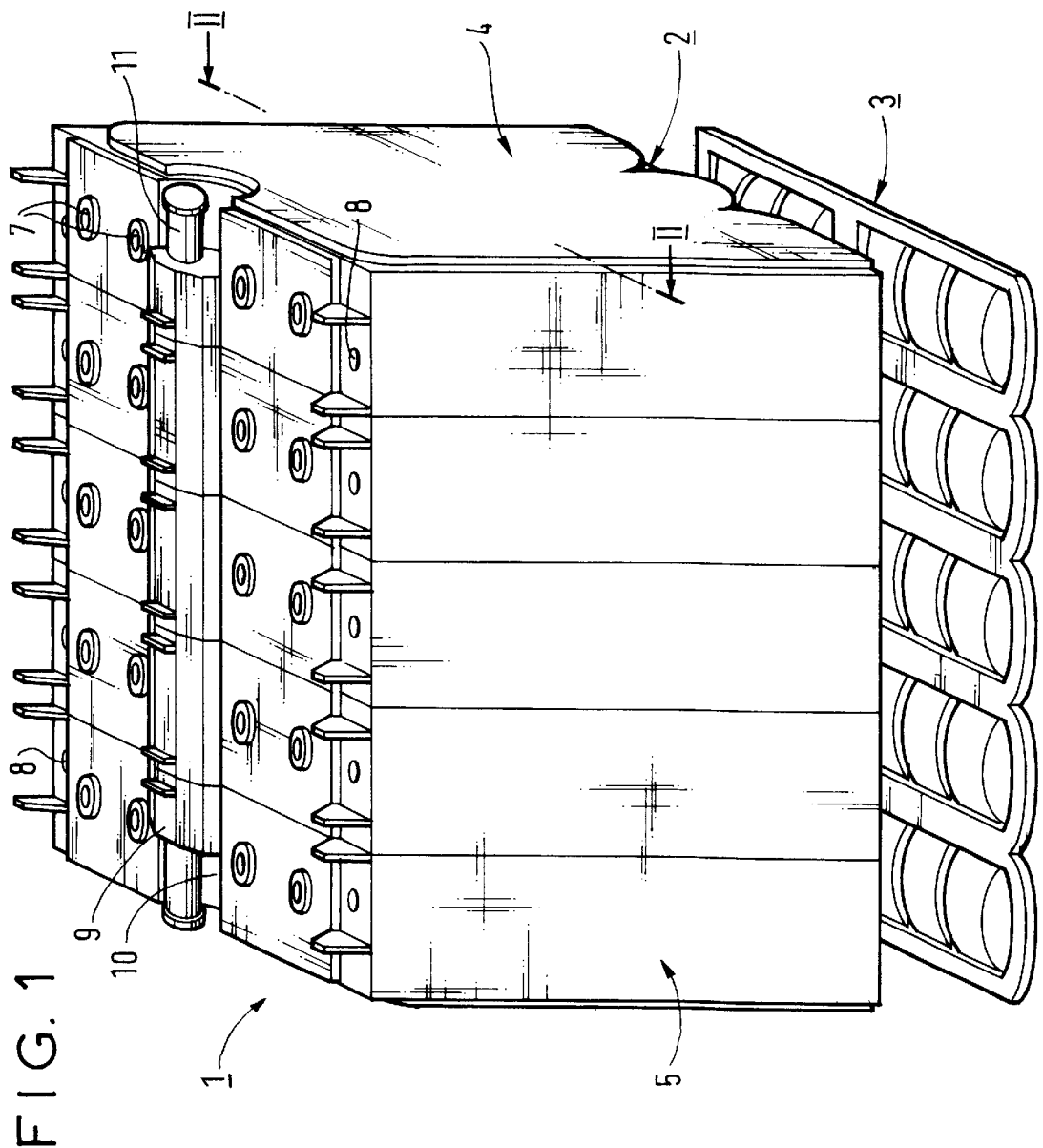
FIG. 1 is a perspective view of the container of a one-piece battery in accordance with the invention comprising ten electrode assemblies.

FIG. 1 shows the prism-shaped container 1 of a battery in accordance with the invention. The container 1 comprises a polypropylene tank 2 and closure means 3 constituting a bottom. The tank 2 has two lateral walls 4, two longitudinal walls 5 and a transverse top wall opposite the bottom 3. The bottom 3 is heat-welded to the tank 2 after the electrode assemblies have been inserted into their respective cells.

The traverse wall of the tank 2 incorporates two orifices 7 for each cell, respectively receiving a terminal of each polarity, and an opening 8 which is initially used to introduce the electrolyte and is closed by a relief valve after filling the cell. A central double inlet/outlet manifold 9 joins up the inlets and outlets for the liquid flowing in the heat exchanger. In a variant, the manifold 9 has at each end an inlet pipe 10 and an outlet pipe 11 for connection to a liquid circulation system or to another one-piece battery.

Figure 2:
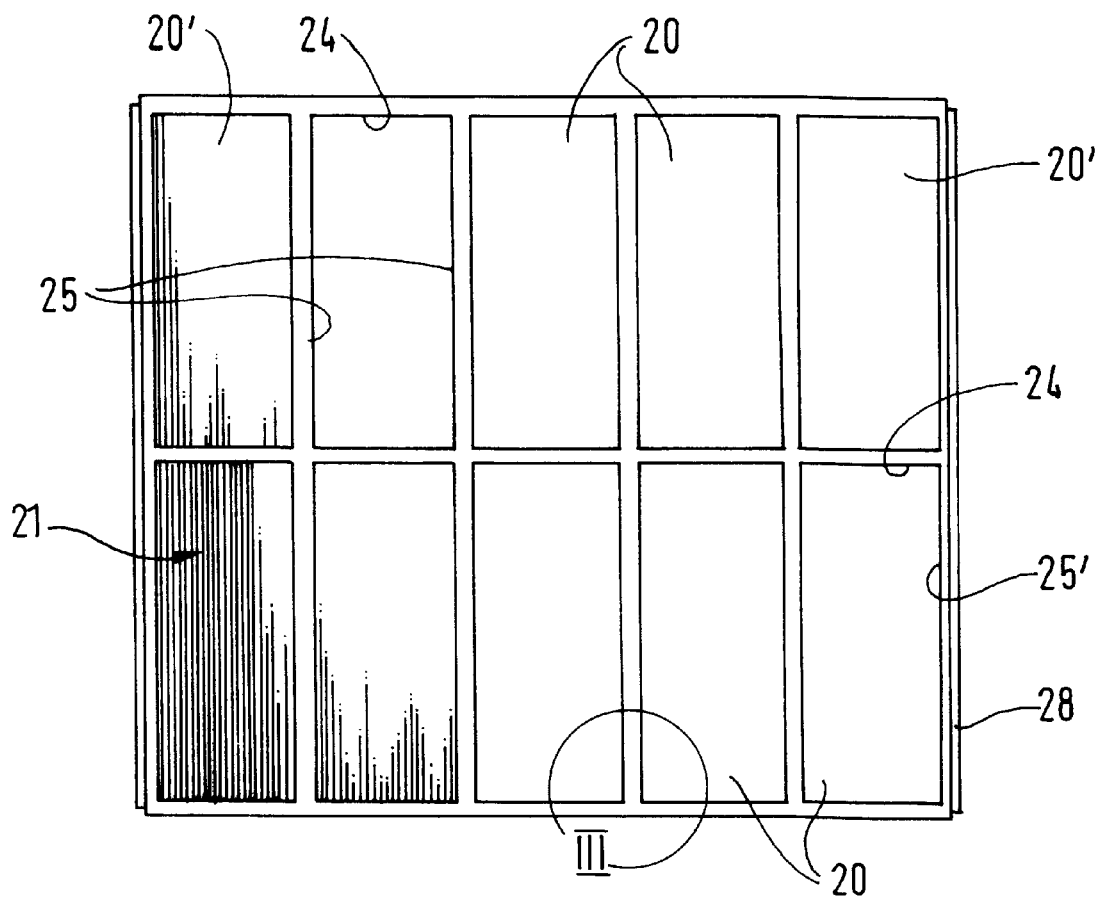
FIG. 2 is a view in section taken along the line II—II in FIG. 1 showing the arrangement of the electrode assemblies in the cells and the position of the fluid circulation compartment.
Figure 3:
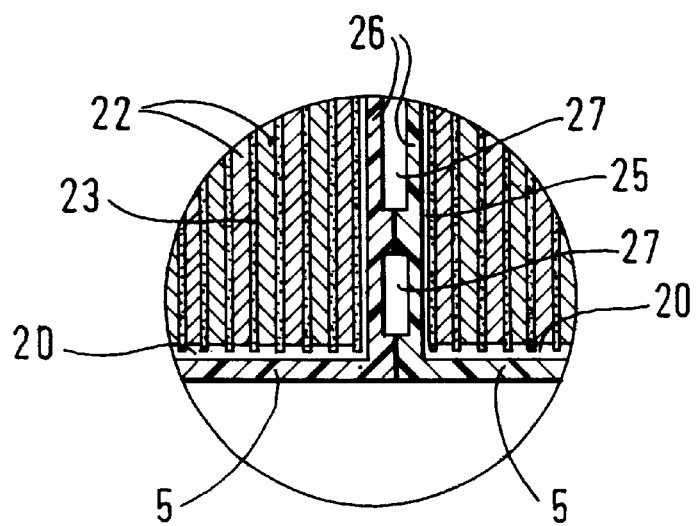
FIG. 3 shows the area III from FIG. 2 to a larger scale.

FIG. 2 shows the battery in accordance with the invention in horizontal section and FIG. 3 shows part of this figure to a larger scale. The tank 2 is divided into cells 20 each adapted to contain an electrode assembly 21 comprising an alternating assembly 22 of positive and negative electrodes separated from each other by a separator 23. The cells 20 are joined side-by-side via their faces 24 that face the edge of the electrodes. The walls 25 between the cells facing the relatively larger faces of the assembly comprise two facing flanges 26 forming a compartment 27 in which a heat exchange fluid flows. At each end of the tank 2 is a cell 20' which is connected on one side to a contiguous cell 20 and is delimited on the opposite side by a wall 25'. The wall 25' is formed by a flange 26 and a plate 28 serving as a flange to close the heat exchange fluid circulation compartment on the outside of the cells 20'.

Figure 4:
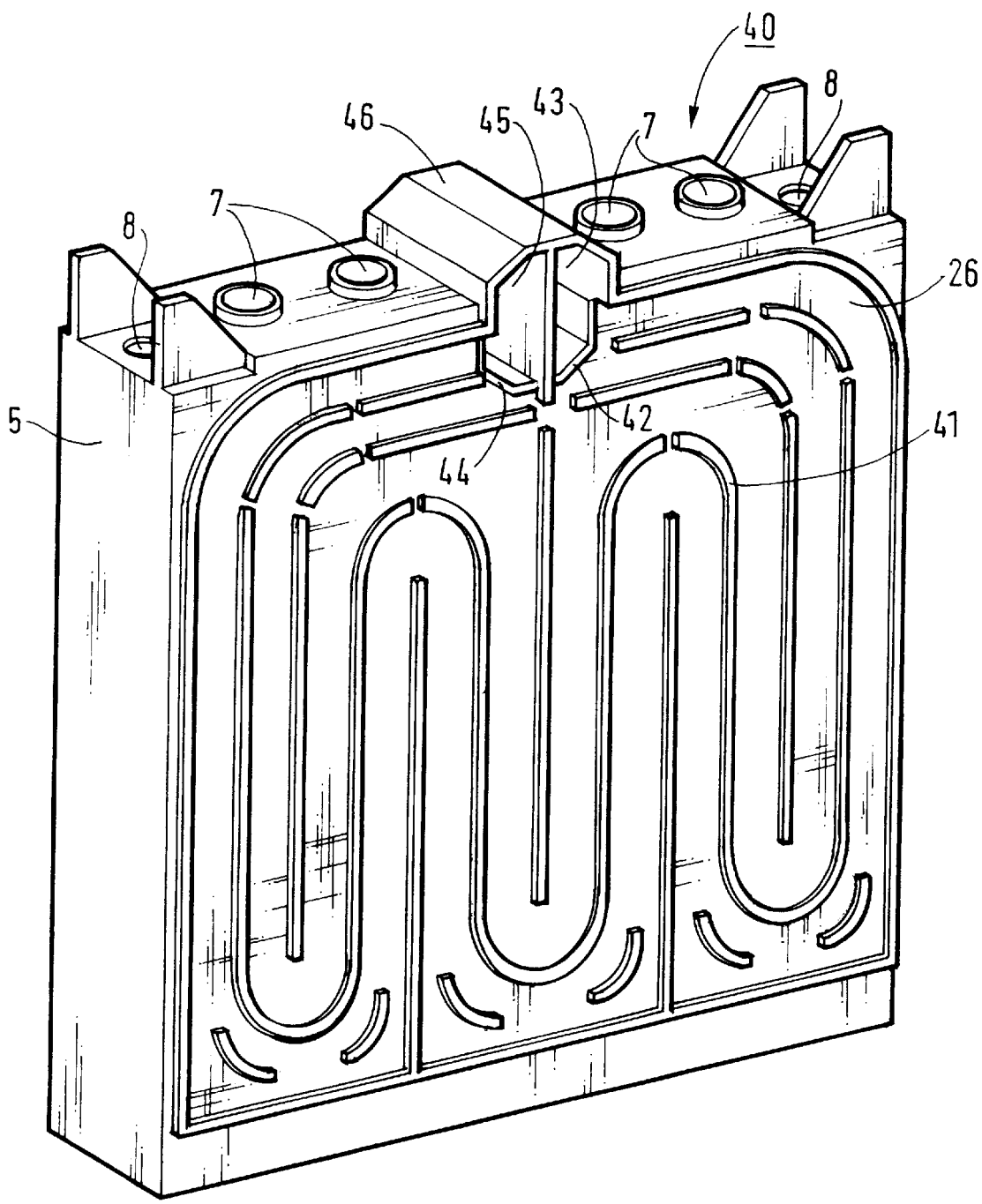
FIG. 4 shows a central unit of the tank from FIG. 1 which comprises two cells.

The tank 2 is fabricated from units 40 incorporating two cells, as shown in FIG. 4. Each unit 40 has four orifices 7 on its top face which receive positive and negative terminals electrically connected to each electrode assembly in each cell. Each unit also incorporates two orifices 8 for filling each cell with electrolyte. The wall facing the relatively larger face of the electrode assembly constitutes a flange 26. The flange 26 includes ribs 41 defining a circuit for the heat exchange liquid, a liquid inlet orifice 42 communicating with an inlet manifold 43 and a liquid outlet orifice 44 communicating with an outlet manifold 45. The ribs 41 and/or the orifices 42, 44 can be divided equally between the facing flanges 26. The ribs 41 have a total height in the order of 3 mm to 4 mm. The inlet manifold 43 and the outlet manifold 45 are joined side-by-side to form a manifold portion 46.

Figure 5:
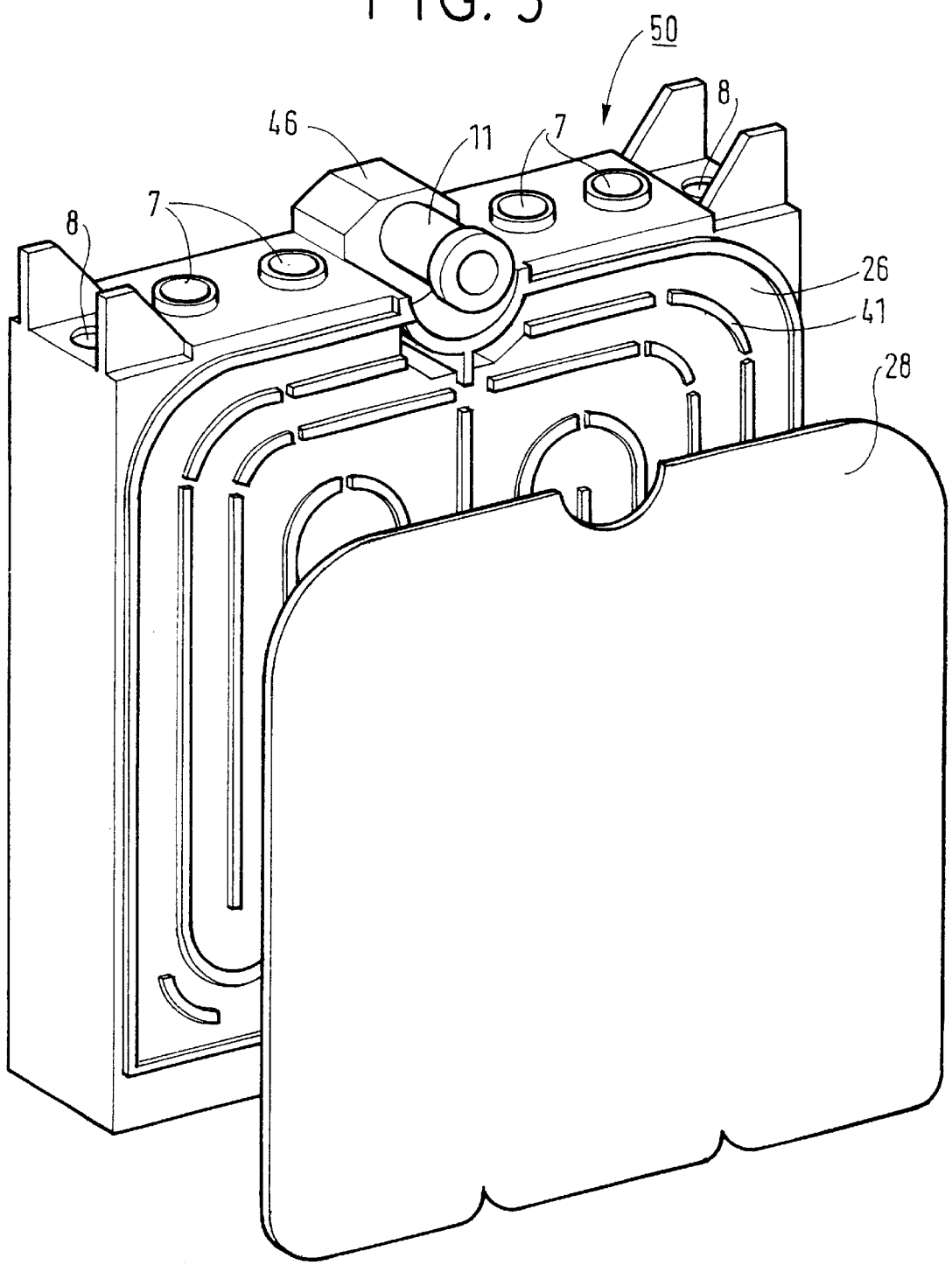
FIG. 5, which is analogous to FIG. 3, shows an end unit of the tank from FIG. 1 which comprises two cells.

The end unit 50 of the one-piece battery shown in FIG. 5 is also a double unit similar to that shown in FIG. 4, except for the manifold portion 46, one end of which includes a pipe 51 that can be connected to n external circuit. The unit 50 can be used at each end of the one-piece battery and thus the pipe 51 can be the liquid inlet pipe 10 or the liquid outlet pipe 11, which are identical. The end unit 50 is joined on one side to a unit 40. On the side opposite that joined to the unit 40, the wall facing the relatively larger face of the electrode assembly constitutes a first flange 26 which cooperates with the end plate 28 constituting the second flange. This closes the liquid circulation compartment at the end of the battery. The ribs 41 can be equally divided between the flange 26 and the facing plate 28.

Of course, a unit 40 can also be used at the end of the battery simply by fitting an appropriate connector to the end of the manifold portion 46. However, in this case the electrode assemblies contained in the cells 20' do not have the benefit of being cooled on both faces, which introduces an imbalance into their operation.

There is claimed:

1. A one-piece battery comprising a tank divided into cells each receiving an electrode assembly, closure means for said tank and a circulating fluid heat exchanger facing relatively larger faces of said assembly, wherein said fluid flows in a compartment defined by two flanges, said compartment has a fluid inlet orifice communicating with a common inlet manifold and a fluid outlet orifice communicating with a common outlet manifold, said tank comprises at least two units, each unit comprises at least one of said cells delimited by at least one wall facing a relatively larger face of said assembly that constitutes one of said flanges, each unit further comprises a portion of said inlet manifold and said outlet manifold, and said units are fastened together so that said flanges when placed face-to-face form a sealed circulation compartment and said portions of the same manifold are aligned with each other.

2. The battery claimed in claim 1 wherein the units at the ends of said battery are connected on the side opposite the other units to a plate constituting one of said flanges.

3. The battery claimed in claim 1 wherein said closure means are in the lower part of said tank and constitute a bottom fixed and sealed to said tank.

4. The battery claimed in claim 1 wherein said inlet manifold and said outlet manifold are on the face of said tank opposite said closure means.

5. The battery claimed in claim 1 wherein at least one of said flanges incorporates a plurality of ribs and said ribs form chicanes for causing said fluid to flow in said compartment alternately in one direction and the opposite direction.

6. A method of manufacturing a battery as claimed in any one of the preceding claims, comprising the following steps:
   at least two of said units are molded in one piece,
   said units are placed side-by-side so that said flanges are pressed together and said manifold portions match up,
   the periphery of said compartment formed by said flanges and the walls of said manifold portions are welded and sealed to obtain said tank,
   an electrode assembly is introduced into each cell, and
   said bottom is welded to said tank.

7. The method claimed in claim 7 wherein, after welding and sealing the periphery of said compartment formed by said flanges and the walls of said manifold portions, a plate constituting a flange is welded to each end to obtain said tank.

* * * * *